Figure 1:
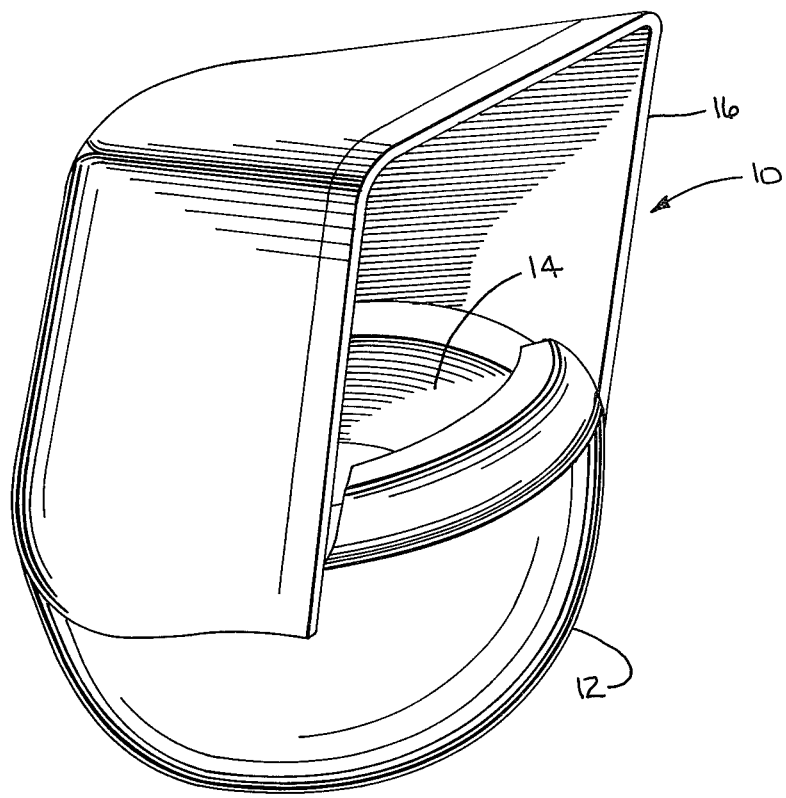

United States Patent [19]

Meyer

[11] 4,440,111
[45] Apr. 3, 1984

[54] MINERAL SUPPLEMENT DISTRIBUTOR

[75] Inventor: Donald A. Meyer, Dorchester, Wis.

[73] Assignee: Meyer's Manufacturing Corp., Dorchester, Wis.

[21] Appl. No.: 448,392

[22] Filed: Dec. 9, 1982

[51] Int. Cl.³ .............................................. A01K 5/00
[52] U.S. Cl. ................................... 119/61; 119/52 R
[58] Field of Search .................. 119/51 R, 52 R, 61, 119/51.5; 46/155

[56] References Cited

U.S. PATENT DOCUMENTS

| | | | |
|---|---|---|---|
| 2,789,532 | 4/1957 | Hoebing | 119/61 |
| 2,937,872 | 5/1960 | Gilman | 46/155 |
| 3,749,063 | 7/1973 | Buffum | 119/61 |
| 3,805,444 | 4/1974 | Adickes | 46/155 |
| 4,029,051 | 6/1977 | McKinney | 119/52 R |
| 4,096,966 | 6/1978 | Korshak | 46/155 |

FOREIGN PATENT DOCUMENTS 2448853  10/1980  France .................................. 119/61

*Primary Examiner*—Gene Mancene
*Assistant Examiner*—Kris R. Schulze
*Attorney, Agent, or Firm*—Andrus, Sceales, Starke & Sawall

[57] ABSTRACT

A mineral supplement distributor has a weighted hemispherical base for biasing the distributor into an upright position. A pan spanning the upper portion of the base receives the mineral supplement. A hood affixed to the base extends over the pan to protect the contents of the pan while permitting access by livestock to the mineral supplement.

3 Claims, 2 Drawing Figures

U.S. Patent    Apr. 3, 1984    4,440,111

MINERAL SUPPLEMENT DISTRIBUTOR

The present invention relates to a mineral supplement distributor for livestock, such as cattle.

Present animal husbandry practices call for minerals as a supplement to other rations for livestock, such as cattle. The mineral supplement is commonly in granular form. The feeders for the mineral supplement are usually placed in the feeding or grazing area for the livestock.

However, the livestock rub against the feeders and tip them over. This spills the mineral supplement onto the ground. The cattle step on the spilled supplement passing it into the ground and rendering it unusable. The mineral supplement is thus wasted.

It is, therefore, the object of the present invention to provide an improved mineral supplement distributor that avoids loss of the mineral supplement in the manner described above.

Briefly, the distributor of the present invention comprises a weighted hemispherical base that rests on the ground. The base may typically be filled with sand or other granular material. The weight of the base renders the distributor self-righting and biases it to the upright position when cattle rub against it. A pan spans the top of the base to receive the mineral supplement. A hood is affixed to the base above the pan to protect the mineral supplement in the pan from the weather. The hood has an opening through which the head of the animal may extend to reach the mineral supplement in the pan.

The invention may be further understood by reference to the following drawings and detailed description of a preferred embodiment.

Figure 2:
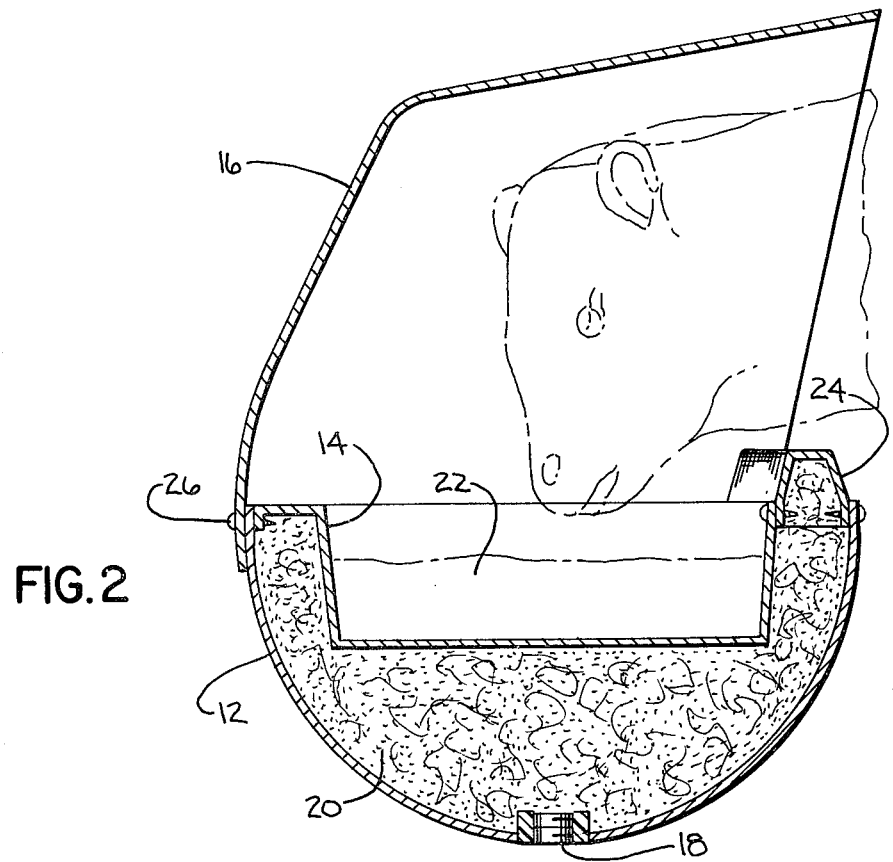

In the drawing:

FIG. 1 is a perspective view of the improved mineral supplement distributor of the present invention; and FIG. 2 is a cross sectional view of the distributor.

In FIG. 1, the numeral 10 indicates the mineral supplement distributor of the present invention. Mineral supplement distributor 10 includes, as its major components, base 12, pan 14, and hood 16.

Base 12 is generally hemispherical in shape and contains weight 20 to lower its center of gravity. Weight 20 may be formed of lead or other similar material. Or, the interior of base 12 may be weighted by filling with a fluid material 20, such as sand, gravel, or the like through threaded plug 18.

Pan 14, containing mineral supplement 22, seals the top of base 12. Lip 24 occupies a portion of the perimeter of pan 14 and base 12 to insure that none of the mineral supplement in pan 14 is lost.

Hood 16 is fastened along the remaining portion of the perimeter of base 12 and pan 14. Hood 16 protects mineral supplement 22 in pan 14 from the weather. Hood 16 is open above lip 24 so that an animal can insert its head into the distributor to eat mineral supplement 22.

Base 12, pan 14, lip 24, and hood 16 may be joined together by an appropriate fastening means, such as self-tapping screws 26, rivets, or the like.

Should the livestock rub against mineral supplement distributor 10 when in use, weight 20 both resists any tipping of the distributor and returns it to the upright position after the rubbing has ceased. This prevents or substantially lessens any loss of mineral supplement 22. Hood 16 and lip 24 further prevent loss of mineral supplement 22.

Various modes of carrying out the invention are contemplated as being within the scope of the following claims particularly pointing out and distinctly claiming the subject matter which is regarded as the invention.

I claim:

1. A distributor for supplying mineral supplements to livestock comprising:

a hemispherical base suitable for resting on the ground, said base having a weight, at least in the lower portion thereof, for biasing said distributor into an upright position and for restoring same to said position when said distributor has been tipped;

a pan attached to and extending across the upper portion of the hemispheric base terminating and closing the upper portion thereof, said pan having a depression in the central portion thereof extending into the hemispherical base for receiving the mineral supplement;

a hood affixed to said base and extending over said pan for protecting the contents of same, said hood having an opening through which the head of livestock may extend to gain access to the mineral supplement in the pan, said hood lying continuously on the base along a portion of the perimeter of the hemispherical base; and said base including a lip extending above said pan and hemispherical base along the remaining portion of the perimeter of said hemispherical base for retaining the mineral supplement in the distributor when the distributor is tipped.

2. The distributor according to claim 1 wherein said weight is formed of a fluid material and wherein said base contains a fill opening for the material.

3. The distributor according to claim 2 wherein said fluid material is a granular material.

* * * * *